(12) United States Patent
Negulescu

(10) Patent No.: US 6,588,195 B2
(45) Date of Patent: Jul. 8, 2003

(54) BLEED VALVE OF A COMPRESSOR, IN PARTICULAR A COMPRESSOR OF A BYPASS AERO-ENGINE

(75) Inventor: Dimitrie Negulescu, Berlin (DE)

(73) Assignee: Rolls-Royce Deutschland Ltd & Co KG, Dahlewitz (DE)

( * ) Notice: Subject to any disclaimer, the term of this patent is extended or adjusted under 35 U.S.C. 154(b) by 0 days.

(21) Appl. No.: 09/731,983

(22) Filed: Dec. 8, 2000

(65) Prior Publication Data

US 2001/0042368 A1 Nov. 22, 2001

(30) Foreign Application Priority Data

Dec. 10, 1999 (DE) .......................................... 199 59 596

(51) Int. Cl.[7] ................................................ F02C 6/18
(52) U.S. Cl. ..................... 60/39.07; 60/39.17; 251/267; 239/559
(58) Field of Search ............................. 60/39.07, 39.17, 60/226.1; 251/267, 266, 367; 440/88; 239/8, 13, 559; 138/30, 40

(56) References Cited

U.S. PATENT DOCUMENTS

| | | | | |
|---|---|---|---|---|
| 3,638,428 A | * | 2/1972 | Shipley et al. ............. | 60/39.07 |
| 4,463,552 A | * | 8/1984 | Monhardt et al. .......... | 60/39.07 |
| 4,938,422 A | * | 7/1990 | Koves ........................ | 239/559 |
| 5,123,240 A | * | 6/1992 | Frost et al. ................. | 60/39.02 |
| 5,163,286 A | * | 11/1992 | Jaw ............................ | 60/39.17 |
| 5,261,228 A | | 11/1993 | Shuba ........................ | 60/226.3 |
| 5,279,109 A | * | 1/1994 | Liu et al. .................... | 60/39.07 |
| 5,351,473 A | * | 10/1994 | Shuba ........................ | 60/39.07 |
| 5,477,673 A | | 12/1995 | Blais et al. ................. | 60/39.07 |
| 5,845,482 A | * | 12/1998 | Carscallen ................. | 60/39.07 |
| 6,048,171 A | * | 4/2000 | Donnelly et al. .......... | 60/39.07 |
| 6,302,752 B1 | * | 10/2001 | Ito et al. ..................... | 440/88 |

FOREIGN PATENT DOCUMENTS

| | | |
|---|---|---|
| DE | 3243279 | 6/1983 |
| WO | WO96/05438 | 2/1996 |

OTHER PUBLICATIONS

Maxim Engine Intake and Exhaust Silencers, 1998, Beaird Industries, 3 pages.*
Experiment 1—Flow Visualization, Dec. 1999, W.L. Hartwell and W.J. Devenport, 16 pages.*
Influence of solid–body rotation on screen–produced turbulence, Aug. 1958, Stephen C. Traugott, 1 page.*

* cited by examiner

Primary Examiner—Charles G. Freay
Assistant Examiner—John F Belena
(74) Attorney, Agent, or Firm—Davidson Berquist; Klima & Jackson LLP

(57) ABSTRACT

This invention relates to a bleed valve of a compressor, in particular a compressor of a bypass aero-engine, with a guiding device provided downstream of a valve body in the bleed duct, said guiding device directing the bleed airflow from a compressor duct to a bypass duct in such a manner that the direction of the flow of the bleed airflow is imparted with a component which is unidirectional with the airflow carried in the bypass duct. The present invention provides a dissipation screen in the bleed duct between the valve body and the guiding device to reduce the energy contained in the bleed airflow, thereby decreasing the loading of the bypass duct. Moreover, the present invention provides for an attenuation chamber downstream of the dissipation screen as viewed in the direction of the bleed airflow. In a preferential arrangement, the guiding device is a plate which is essentially parallel to the wall of the bypass duct and which contains a plurality of bores inclined in the direction of flow of the airflow carried in the bypass duct.

18 Claims, 2 Drawing Sheets

BLEED VALVE OF A COMPRESSOR, IN PARTICULAR A COMPRESSOR OF A BYPASS AERO-ENGINE

Figure 1:
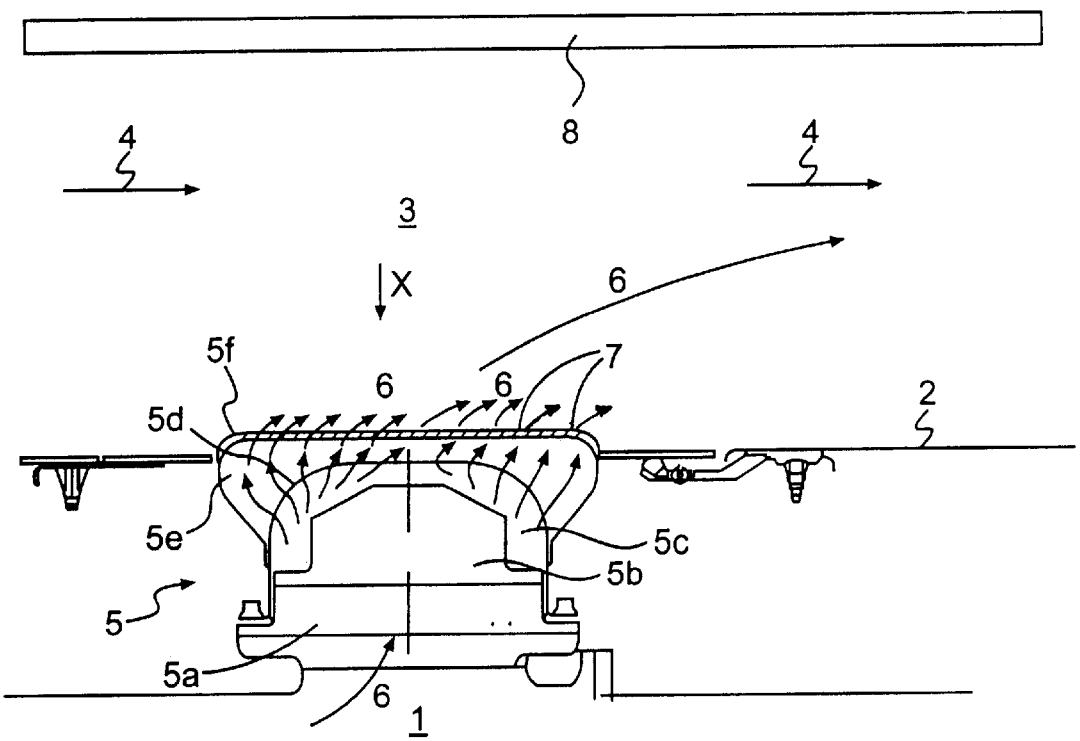

This invention relates to a bleed valve of a compressor, in particular a compressor of a bypass aero-engine, with a guiding device provided downstream of a valve body in the bleed duct, said guiding device directing the bleed airflow from a compressor duct into a bypass duct in such a manner that the direction of flow of the bleed airflow is imparted a component which is unidirectional with the airflow carried in the bypass duct. For background art, reference is made to Specification U.S. Pat. No. 4,463,552, by way of example.

It is generally known that compressors, in particular those for gases, are provided with bleed valves to preclude the compressor from exceeding its surge limits, i.e. some of the gas flow or airflow compressed in the compressor is bled, if necessary, from the compressor without passing all stages of the multi-stage and in particular the multi-stage axial-flow compressor. In the case of bypass aero-engines, the so-called bleed airflow of the compressor is introduced into the bypass duct which carries the airflow supplied by the engine fan.

The known, simple bleed valves are provided with discharge ducts which introduce the bleed airflow into the bypass duct essentially vertically to the bypass airflow carried therein. In these designs, the outlet ports of these discharge ducts are vertical to the wall of the bypass duct. Since the bleed airflow can be very hot, failure of the bleed valve or its control is liable to cause damage to the bypass duct or its wall, respectively, in particular if the bleed valve is open for a longer period of time. The hot supersonic flow bled from the compressor will then have a detrimental effect on the structure of the bypass duct and the components adjacent to it.

The bleed valve taught in Specification U.S. Pat. No. 4,463,552 mentioned in the beginning reduces this detrimental effect by way of a guiding device which introduces the bleed airflow to the bypass duct in at least partly the direction of flow of the airflow carried therein; however, in a broad aspect, the present invention provides further, beneficial features to remedy the above problematics.

It is a particular object of this invention to provide a so-called dissipation screen in the bleed duct between the valve body and the guiding device. Further aspects and advantages of the present invention are cited in the sub-claims.

Besides the guiding device, the present invention provides a dissipation screen which reduces some of the kinetic energy, i.e. some of the impulse of the bleed airflow. Upon being released via the opened valve body, the bleed airflow passes this essentially narrow-meshed dissipation screen (or dissipation grid or the like) provided in the bleed duct of the bleed valve and, via the guiding device, enters the bypass duct in the desired direction of flow. The swirling and intensive throttling action at the so-called dissipation screen reduces the impulse of the bleed airflow introduced to the bypass duct to such an extent that it will produce virtually no detrimental effect on the bypass duct. In addition, the dilution between the airflow carried in the bypass duct and the bleed airflow introduced to it will thus be improved, a generally desirable effect.

With regard to the operation of the guiding device, the provision of a so-called attenuation chamber between the guiding device and the dissipation grid can be beneficial to partly reduce the swirl effected at the dissipation screen (or grid). A guiding device which is particularly favorable since it includes the function of a screen (or grid) is explained in claim 3, according to which the guiding device is designed as a plate which is essentially parallel to the wall of the bypass duct, this plate being provided with a plurality of bores whose axes are inclined in the direction of flow of the airflow carried in the bypass duct. Here, optimum results are obtained when the surface of the guiding device is essentially twice the surface of the dissipation screen since, then, the additional throttling effect at the dissipation screen will not impair the throughput potential of the bleed valve.

Figure 2:
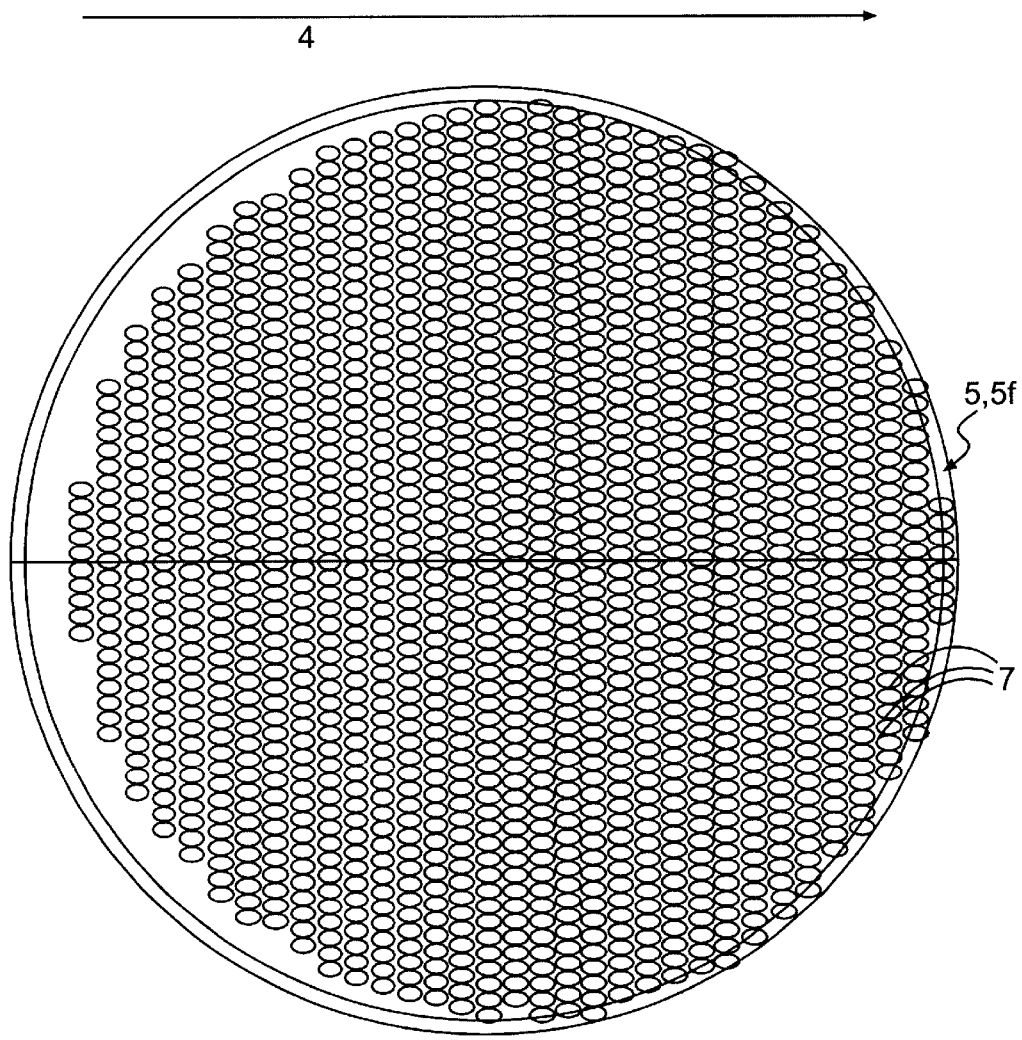

Further objects and advantages of this invention will become apparent from the following detailed description of a preferred embodiment read in the light of the accompanying FIG. 1 which illustrates a cross-section of a compressor bleed valve in accordance with the present invention in the installed state (between a compressor annulus and a bypass duct), with reference being made to FIG. 2 which shows the View X of FIG. 1. In this context, all features described in detail can be essential for the invention.

Reference numeral 1 indicates the compressor duct or the compressor annulus or the flow duct of a multi-stage axial-flow compressor of an aero-engine which has a by-pass duct 3 which extends parallel to it and is separated from it by a separating wall 2, this axial-flow compressor not being further illustrated. The airflow 4 is delivered into this bypass duct 3 by the fan of the otherwise conventional bypass engine, as indicated by the arrowheads.

In the separating wall 2, a bleed valve 5 is provided which serves to discharge some of the airflow compressed in the compressor and carried in the compressor duct 1 from the compressor duct 1 to the bypass duct 3 as a so-called bleed airflow 6, the reason for this discharge being explained further above. A conventional valve body 5b, which is not further detailed herein, is provided in a bleed duct 5a to appropriately increase or decrease the flow area of the bleed duct 5a, this bleed duct 5a of the bleed valve 5 connecting the compressor duct 1 with the bypass duct 3. With reference to the direction of the bypass airflow 6 downstream of this valve body 5b, a first attenuation chamber 5c, which is bounded by a dissipation screen 5d, is provided in the bleed duct 5a. The bleed airflow 6 discharged from the compressor duct 1 passes via this essentially narrow-meshed dissipation screen 5d and enters a second attenuation chamber 5e, this chamber being bounded by a guiding device 5f provided in the bypass duct 5a. As it passes this guiding device 5f, the bleed airflow 6 is imparted a direction of flow which has a component which is unidirectional with the airflow 4 carried in the bypass duct 3. As illustrated in FIG. 1 and, in particular, in FIG. 2, the guiding device 5f has the form of a plate which is essentially parallel to the separating wall 2, i.e. the wall of the bypass duct 3, and which is provided with a plurality of bores 7 inclined in the direction of flow of the airflow 4 carried in the bypass duct 3. Accordingly, the bleed airflow passing these bores 7 or the guiding device 5f, respectively, in the direction of the arrowheads 6 will not enter the bypass duct 3 vertically to the separating wall 2, but will already be partly unidirectional with the direction of the airflow 4 carried therein. This measure alone prevents the hot supersonic bleed airflow 6 from impinging virtually frontally onto the outer boundary wall 8 of the bypass duct 3 which is parallel to the separating wall 2, thereby avoiding detrimental effects to this outer boundary wall or its environment, respectively.

Moreover, the dissipation screen 5d is particularly favorable in terms of a desired reduction of the energy contained in the bleed airflow 6. Since some of the impulse of the bleed airflow 6 is destroyed at this dissipation screen 5d, the bypass duct 3 is prevented from being damaged.

In other words, the bleed valve 5 as illustrated and described herein comprises a discharge duct which is double-walled and which may be termed two-stage dissipation duct in that it consists of the dissipation screen 5d with the downstream attenuation chamber 5e and the subsequent guiding device 5f. As illustrated, the second dissipation stage, i.e. the guiding device 5f, is mushroom-shaped, while the first dissipation stage is designed as dissipation screen 5d and features exit ports (not further indicated) which are essentially vertical to its surface. On the other hand, the guiding device 5f or the second dissipation stage, respectively, deflects the bleed airflow 6 by 60 angular degrees, namely by way of the bores 7 whose longitudinal axes are here inclined or set rearward by 30 angular degrees relative to the separating wall 2.

To ensure that these two dissipation measures, i.e. the guiding device 5f and the dissipation screen 5d, do not impair the throughput potential via the bleed valve 5, the flow exit area of the of the second stage, i.e. the cross-sectional area of all bores 7 of the guiding device 5f, is approximately twice the flow exit area of the first stage, i.e. the dissipation screen 5d.

The advantage of the bleed valve 5 according to the present invention lies in the staged dissipation of the bleed airflow 6 in the so-called dissipation ducts arranged one behind the other, i.e. the dissipation screen 5d and the guiding device 5f, these features providing for a fifty-percent reduction of the flow impulse with the throughput remaining unchanged (this being ensured by the mushroom shape of the second dissipation duct, i.e. the guiding device 5f) and, in connection with the re-direction of the airflow by 60 angular degrees as described in the above, enabling the hot bleed airflow 6 to be completely diluted in the cold airflow 4 carried in the bypass duct 3, thereby avoiding the detriments as they may occur if a bleed valve 5 accidentally stays open. Because of this dilution, the temperature of the airflow attacking the outer boundary wall 8 of the bypass duct 3 is reduced below the limiting value for the material, and apparently a plurality of modifications, especially as to design, other than those described may be made to the embodiments here shown without departing from the inventive concept.

List of reference numerals:

| | |
|---|---|
| 1 | Compressor duct |
| 2 | Separating wall |
| 3 | Bypass duct |
| 4 | Airflow in 3 (direction of arrowhead) |
| 5 | Bleed valve |
| 5a | Bleed duct |
| 5b | Valve body |
| 5c | First attenuation chamber |
| 5d | Dissipation screen |
| 5e | Second attenuation chamber |
| 5f | Guiding device |
| 6 | Bleed airflow |
| 7 | Bore |
| 8 | Outer boundary wall (of 3) |

What is claimed is:

1. A bleed valve of a compressor of a bypass aero-engine, comprising:
    a bleed duct;
    a valve body;
    a dissipation screen positioned at a distance downstream from the valve body; and
    a guiding device positioned at a distance downstream from the dissipation screen.

2. The bleed valve of claim 1, and further comprising:
    a first attenuation chamber positioned between the valve body and the dissipation screen.

3. The bleed valve of claim 2, and further comprising:
    a second attenuation chamber positioned between the dissipation screen and the guiding device.

4. The bleed valve of claim 3, wherein the guiding device is in the form of a plate that is essentially parallel to a wall of a bypass duct of the aero-engine, the guiding device including a plurality of bores therethrough that are inclined towards a direction of flow of airflow carried by the bypass duct.

5. The bleed valve of claim 4, wherein the bores of the guiding device are inclined at an acute angle towards the direction of flow of airflow carried by the bypass duct.

6. The bleed valve of claim 5, wherein a flow exit area of the guiding device is larger than a flow exit area of the dissipation screen.

7. The bleed valve of claim 6, wherein the flow exit area of the guiding device is essentially twice the flow exit area of the dissipation screen.

8. The bleed valve of claim 1, and further comprising:
    a second attenuation chamber positioned between the dissipation screen and the guiding device.

9. The bleed valve of claim 1, wherein the guiding device is in the form of a plate that is essentially parallel to a wall of a bypass duct of the aero-engine, the guiding device including a plurality of bores therethrough that are inclined towards a direction of flow of airflow carried by the bypass duct.

10. The bleed valve of claim 9, wherein the bores of the guiding device are inclined at an acute angle towards the direction of flow of airflow carried by the bypass duct.

11. The bleed valve of claim 1, wherein a flow exit area of the guiding device is larger than a flow exit area of the dissipation screen.

12. The bleed valve of claim 11, wherein the flow exit area of the guiding device is essentially twice the flow exit area of the dissipation screen.

13. The bleed valve of claim 2, wherein a flow exit area of the guiding device is larger than a flow exit area of the dissipation screen.

14. The bleed valve of claim 13, wherein the flow exit area of the guiding device is essentially twice the flow exit area of the dissipation screen.

15. The bleed valve of claim 3, wherein a flow exit area of the guiding device is larger than a flow exit area of the dissipation screen.

16. The bleed valve of claim 15, wherein the flow exit area of the guiding device is essentially twice the flow exit area of the dissipation screen.

17. The bleed valve of claim 4, wherein a flow exit area of the guiding device is larger than a flow exit area of the dissipation screen.

18. The bleed valve of claim 17, wherein the flow exit area of the guiding device is essentially twice the flow exit area of the dissipation screen.

* * * * *